(12) United States Patent
Du et al.

(10) Patent No.: US 9,578,498 B2
(45) Date of Patent: Feb. 21, 2017

(54) FACILITATING AUTHENTICATION OF ACCESS TERMINAL IDENTITY

(75) Inventors: Zhimin Du, Beijing (CN); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 13/577,888

(22) PCT Filed: Mar. 16, 2011

(86) PCT No.: PCT/CN2011/071855
§ 371 (c)(1),
(2), (4) Date: Sep. 13, 2012

(87) PCT Pub. No.: WO2011/113355
PCT Pub. Date: Sep. 22, 2011

(65) Prior Publication Data
US 2013/0036223 A1  Feb. 7, 2013

(30) Foreign Application Priority Data

Mar. 16, 2010  (CN) .......................... 2010 1 0131514

(51) Int. Cl.
G06F 15/173  (2006.01)
H04W 12/06  (2009.01)
G06F 21/44  (2013.01)

(52) U.S. Cl.
CPC .............. *H04W 12/06* (2013.01); *G06F 21/44* (2013.01)

(58) Field of Classification Search
CPC .............................. H04W 12/00; G06F 21/62
(Continued)

(56) References Cited

U.S. PATENT DOCUMENTS 6,408,175 B1  6/2002 Park
6,804,506 B1  10/2004 Freitag et al.
(Continued)

FOREIGN PATENT DOCUMENTS

CN  1183202 A  5/1998
CN  1225226 A  8/1999
(Continued)

OTHER PUBLICATIONS

3GPP: "3rd Generation Partnership Project; Technical Specification Group Service and Systems Aspects: Security of H(e)NB; (Release 8)", 3GPP TR 33.820 V8.3.0, vol. 33.820, No. V8.3.0 Dec. 1, 2009 (Dec. 1, 2009), pp. 1-99, XP002650893, Retrieved from the Internet: URL:http://www.quintillion.co.jp/3GPP/Spec s/33820-830.pdf Sections 6 and 7.
(Continued)

*Primary Examiner* — Shaq Taha
(74) *Attorney, Agent, or Firm* — Won Tae C. Kim

(57) ABSTRACT

Methods and apparatuses are provided for facilitating authentication of access terminal identities and for recording a usage relationship between a valid access terminal identity and a user identity. An access terminal and a validation server are both provisioned with corresponding validation keys. The access terminal may determine that a user identity is not recorded for use with the access terminal, and may send a report message to report a usage relationship between the access terminal identity and the user identity, where the report message is signed with a signature based on the validation key. The validation server authenticates the signature using the validation key in the validation server. The validation server may record the usage relationship between the authenticated access terminal identity and the user identity in a database, which database records may be
(Continued)

employed to determine whether an access terminal requesting network access is authorized or unauthorized.

39 Claims, 9 Drawing Sheets

(58) Field of Classification Search
USPC .......................................................... 726/28
See application file for complete search history.

(56) References Cited

U.S. PATENT DOCUMENTS

| | | | |
|---|---|---|---|
| 6,826,690 | B1 | 11/2004 | Hind et al. |
| 7,203,836 | B1 | 4/2007 | Maringer et al. |
| 7,325,133 | B2 | 1/2008 | Fascenda |
| 7,769,175 | B2 | 8/2010 | Bajar et al. |
| 7,779,267 | B2 | 8/2010 | Chen et al. |
| 7,966,000 | B2 | 6/2011 | Semple et al. |
| 8,566,926 | B1 | 10/2013 | Schnellbacher et al. |
| 8,645,699 | B2 | 2/2014 | Wood et al. |
| 2002/0073229 | A1 | 6/2002 | Hayashi |
| 2002/0091933 | A1 | 7/2002 | Quick et al. |
| 2004/0111616 | A1 | 6/2004 | Adi |
| 2004/0180657 | A1 | 9/2004 | Yaqub et al. |
| 2006/0089123 | A1 | 4/2006 | Frank |
| 2006/0120531 | A1 | 6/2006 | Semple et al. |
| 2006/0206710 | A1 | 9/2006 | Gehrmann |
| 2006/0236369 | A1 | 10/2006 | Covington et al. |
| 2006/0291422 | A1 | 12/2006 | Rochford |
| 2007/0010242 | A1 | 1/2007 | Blants et al. |
| 2007/0016780 | A1 | 1/2007 | Lee et al. |
| 2007/0142086 | A1 | 6/2007 | Boursier et al. |
| 2008/0003980 | A1* | 1/2008 | Voss et al. ................... 455/411 |
| 2008/0295159 | A1 | 11/2008 | Sentinelli |
| 2008/0301776 | A1 | 12/2008 | Weatherford |
| 2009/0075584 | A1 | 3/2009 | Jung et al. |
| 2009/0172798 | A1 | 7/2009 | Upp |
| 2009/0217039 | A1 | 8/2009 | Kurapati et al. |
| 2009/0227234 | A1 | 9/2009 | Bosch et al. |
| 2009/0239503 | A1 | 9/2009 | Smeets |
| 2009/0249069 | A1 | 10/2009 | Daskalopoulos et al. |
| 2009/0258631 | A1 | 10/2009 | Forsberg et al. |
| 2009/0282256 | A1* | 11/2009 | Rakic et al. ................. 713/176 |
| 2010/0031366 | A1* | 2/2010 | Knight et al. ................. 726/26 |
| 2010/0167740 | A1 | 7/2010 | Vakil et al. |
| 2010/0278141 | A1* | 11/2010 | Choi-Grogan .... H04W 36/0083 370/331 |
| 2010/0311419 | A1 | 12/2010 | Bi |
| 2010/0313024 | A1 | 12/2010 | Weniger et al. |
| 2010/0317405 | A1 | 12/2010 | Keevill et al. |
| 2011/0010543 | A1 | 1/2011 | Schmidt et al. |
| 2011/0086616 | A1* | 4/2011 | Brand et al. ................. 455/411 |
| 2011/0122813 | A1* | 5/2011 | Choe et al. ................... 370/328 |
| 2011/0219427 | A1* | 9/2011 | Hito et al. ........................ 726/3 |
| 2011/0271330 | A1 | 11/2011 | Zhang |
| 2011/0314287 | A1 | 12/2011 | Escott et al. |
| 2012/0100832 | A1 | 4/2012 | Mao et al. |
| 2012/0144202 | A1 | 6/2012 | Counterman |
| 2012/0233685 | A1 | 9/2012 | Palanigounder et al. |
| 2014/0128025 | A1* | 5/2014 | Raleigh .................. H04W 8/22 455/406 |

FOREIGN PATENT DOCUMENTS

| | | |
|---|---|---|
| CN | 1231108 A | 10/1999 |
| CN | 1684411 A | 10/2005 |
| CN | 1719919 A | 1/2006 |
| CN | 1921661 A | 2/2007 |
| CN | 101018174 A | 8/2007 |
| CN | 101026453 A | 8/2007 |
| CN | 101056456 A | 10/2007 |
| CN | 101448257 A | 6/2009 |
| CN | 101945386 A | 1/2011 |
| EP | 1739903 A1 | 1/2007 |
| EP | 2291015 A1 | 3/2011 |
| JP | 2000510303 A | 8/2000 |
| JP | 2002345041 A | 11/2002 |
| JP | 2003535497 A | 11/2003 |
| JP | 2004035538 A | 2/2004 |
| JP | 2004297138 A | 10/2004 |
| JP | 2005078220 A | 3/2005 |
| JP | 2006245831 A | 9/2006 |
| JP | 2007281861 A | 10/2007 |
| JP | 2007336219 A | 12/2007 |
| JP | 2008527905 A | 7/2008 |
| JP | 2009188765 A | 8/2009 |
| JP | 2009278388 A | 11/2009 |
| KR | 20070003484 A | 1/2007 |
| KR | 20100106543 A | 10/2010 |
| WO | WO-9635304 A1 | 11/1996 |
| WO | WO-9636194 A1 | 11/1996 |
| WO | WO-9743866 A2 | 11/1997 |
| WO | WO-0143108 A1 | 6/2001 |
| WO | WO-0149058 A1 | 7/2001 |
| WO | WO2007121190 | 10/2007 |
| WO | WO-2009029156 A1 | 3/2009 |
| WO | 2010039445 A2 | 4/2010 |

OTHER PUBLICATIONS

Calhoun P., et al., "Diameter Base Protocol RFC 3588", Internet Engineering Task Force (IETF), Sep. 2003 (Sep. 2003), XP015009370.

Chen, et al., "A Secure Relay-Assisted Handover Protocol for Proxy Mobile IPv6 in 3GPP LTE Networks", Wireless Personal Communications, 2010.

Eronen P., et al., "Diameter Extensible Authentication RFC 4072", Internet Engineering Task Force (IETF) Aug. 2005 (Aug. 2005), XP015041927.

Funk P., et al., "Extensible Authentication Protocol Tunneled Transport Layer Security Authenticated Protocol Version 0 (EAP-TTLSv0); RFC 5281", Internet Engineering Task Force (IETF), Aug. 2008 (Aug. 2008), XP015060268.

International Search Report and Written Opinion—PCT/CN2011/071855, ISA/EPO—Jun. 30, 2011.

International Search Report and Written Opinion—PCT/US2012/028611—ISA/EPO—May 23, 2012.

Simon D., et al., "The EAP-TLS Authentication Protocol; RFC 5216", Internet Engineering Task Force (IETF), Mar. 1, 2008 (Mar. 1, 2008), XP015055258.

Menezes A J., et al., Handbook of Applied Cryptography, CRC Press, 1997, pp. 403-405.

* cited by examiner

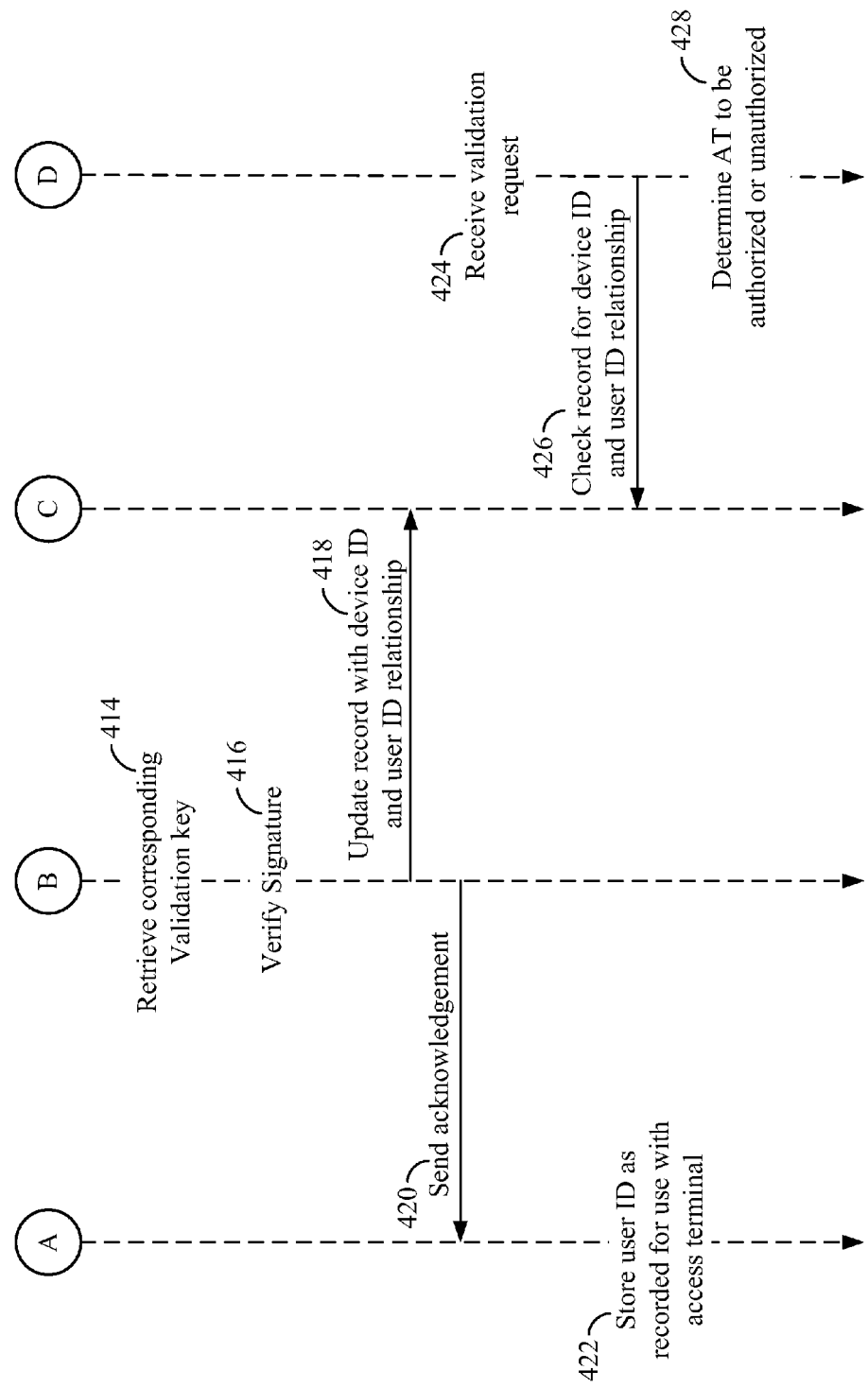

FACILITATING AUTHENTICATION OF ACCESS TERMINAL IDENTITY

CLAIM OF PRIORITY

The present application for patent claims priority to Chinese Patent Application No. 201010131514.2 entitled "Method and Apparatus for Administration and Validation of Communication Device's Identity" filed Mar. 16, 2010, and assigned to the assignee hereof and hereby expressly incorporated by reference herein in its entirety.

BACKGROUND

Field

Various features disclosed herein pertain generally to wireless communication systems, and at least some features pertain to devices and methods for facilitating the authentication of access terminal identities and usage relationships between access terminal identities and user identities.

Background

Access terminals, such as mobile phones, pagers, wireless modems, personal digital assistants, personal information managers (PIMs), personal media players, palmtop computers, laptop computers, or any other device with a processor that communicates with other devices through wireless signals are becoming increasingly popular and are used more frequently. Subscribers using such access terminals in a wireless communication network are typically authenticated by the wireless communication network before being granted access to initiate and/or receive calls and transmit and/or receive data. Traditionally, wireless communication networks authenticate a subscriber by verifying a user identity comprising cryptographic information contained in and provided by, for example, an access terminal's Subscriber Identification Module (SIM) for GSM networks, Universal Subscriber Identification Module (USIM) for UMTS/LTE networks and Removable User Identification Module (RUIM) for CDMA networks. These SIMs, USIMs and RUIMs are typically chip and pin based cards that contain information about the subscriber/user of the access terminal and are removable from the access terminal. Users of access terminals equipped with such removable user identity modules are typically able to remove the SIM, USIM or RUIM card from one access terminal and place the card in another access terminal, thereby transferring their subscriber information easily from one access terminal to another.

While conventional wireless communication networks are adapted to authenticate the subscriber card (e.g., SIM, USIM, RUIM) being used in an access terminal, it may also be desirable for the wireless communication networks to authenticate the access terminal itself, and deny or allow network access to the access terminal based on the outcome of the access terminal authentication. There are a number of reasons why a network operator would want to authenticate the access terminal in addition to the subscriber card. One common reason includes, for example, authentication of access terminals in order to deter unauthorized manufacturers from producing or refurbishing access terminals that are not approved for use within a wireless communication network (e.g., grey market access terminals). By utilizing an authentication system that authenticates access terminals, the network operator may deny service to those access terminals produced or refurbished by unauthorized manufacturers that fail to authenticate with valid access terminal identification. Another common reason involves the risks of terrorist attacks carried out in part with the use of unauthorized access terminals. Government entities have recently expressed a strong desire that network operators be able to trace, track, authenticate, and disable all access terminals operating within a network operator's wireless communication network. Having the ability to authenticate an access terminal and deny service accordingly would prove advantageous in stopping criminal activities.

There currently exist mechanisms which enable wireless communication networks to query an access terminal's identity (ID). For example, a wireless communication network (e.g., GSM network, WCDMA network, TD-SCDMA network) may query and check an international mobile equipment identity (IMEI) number for 3GPP-compliant access terminals, or a wireless communication network (e.g., CDMA) may query and check a mobile equipment identifier (MEID) for 3GPP2-compliant access terminals. However, these existing mechanisms for obtaining an access terminal's ID fail to provide any assurance that the ID received from an access terminal actually belongs to that access terminal. For example, an unauthorized access terminal can illegally copy or otherwise obtain the ID of an authorized access terminal, and then provide that pirated ID to the requesting wireless communication network. In such a situation, the conventional wireless communication network is unable to distinguish between an authorized access terminal and an unauthorized access terminal employing a faked ID.

Therefore, there is a need for methods, apparatus, and/or systems that are adapted to both discover and validate the identity of an access terminal.

SUMMARY

Various features facilitate the authentication of access terminal identities and usage relationships between access terminal identities and user identities. One feature provides access terminals adapted to facilitate such authentication. These access terminals may comprise processing circuit coupled to a communications interface adapted to facilitate wireless communications, a user identity module including a user identity, and to a storage medium.

The user identity may comprise an International Mobile Subscriber Identity (IMSI). According to some implementations, the user identity module can comprise a removable user identity module such as a Subscriber Identification Module (SIM), a Universal Subscriber Identity Module (USIM), a CDMA Subscriber Identification Module (CSIM) or a Removable User Identification Modules (RUIM).

The storage medium may include a validation key and an access terminal identity stored therein. The access terminal identity can comprise one of an International Mobile Equipment Identity (IMEI) or a Mobile Equipment Identity (MEID).

The processing circuit may be adapted to determine that the user identity from the user identity module is not recorded for use with the access terminal. The processing circuit may generate a report message including the user identity and the access terminal identity. The report message may be generated in response to receipt of a request transmission or in response to a determination that the user identity has not been recorded for use. The report message can be adapted to report a usage relationship between the user identity and the access terminal identity. The processing circuit may sign the report message with a signature generated using the validation key, where the signature can authenticate that the access terminal is authorized to use the access terminal identity included in the report message.

Using the communications interface, the processing circuit can send a transmission including the signed report message to a validation server. Such a transmission may be sent as one of a Short Messaging Service (SMS) message, a packet-based message, or a signaling message.

According to various embodiments, the processing circuit may be further adapted to receive an acknowledgement via the communications interface, where the acknowledgement indicates that the reported usage relationship between the user identity and the access terminal identity is validated and recorded. The processing circuit may then store user identity in the storage medium as recorded for use with the access terminal.

A method operational on an access terminal is also provided according to a feature. In at least one implementation of such methods, for instance, a validation key can be stored in a storage medium. A user identity from a user identity module in the access terminal can be determined to not be recorded for use with the access terminal. A report message may be generated, which includes the user identity and an access terminal identity. The report message can be adapted to report a usage relationship between the user identity and the access terminal identity. The report message may be signed with a signature generated based on the validation key, where the signature is adapted to authenticate that the access terminal is authorized to use the access terminal identity included in the report message. The signed report message can be sent in a transmission to a validation server.

Additional features provide validation servers adapted to facilitate the authentication of access terminal identities and usage relationships between access terminal identities and user identities. Such validation servers may comprise a communications interface adapted to facilitate wireless communications, a storage medium, and a processing circuit coupled to the communications interface and the storage medium. The communications interface, storage medium and processing circuit may be implemented integral with an equipment identity register (EIR).

The processing circuit may be adapted to receive and store a validation key in the storage medium. The processing circuit may receive a transmission from an access terminal, via the communications interface. The transmission may include a report message reporting a usage relationship between an access terminal identity and a user identity in the access terminal, where the report message is signed with a signature. The processing circuit may authenticate the signature of the report message using the validation key to verify that the access terminal is authorized to use the access terminal identity included in the report message.

According to some embodiments, the processing circuit may be further adapted to record the usage relationship between the access terminal identity and the user identity in a database accessible to the EIR. The processing circuit when implemented integral with the EIR, may also be adapted to receive via the communications interface a validation request transmission including the user identity and the access terminal identity from a network entity, query the database for a record verifying a valid usage relationship between the user identity and the access terminal identity, determine the access terminal to be authorized if a record in the database verifies the usage relationship between the user identity and the access terminal identity, and determine the access terminal to be unauthorized if a record in the database disproves the usage relationship or if no record in the database verifies the usage relationship between the user identity and the access terminal identity.

A method operational on a validation server is also provided according to a feature. According to one or more implementations of such methods, a validation key may be received and stored in a storage medium. A transmission may be received from an access terminal, which transmission may include a report message reporting a usage relationship between an access terminal identity and a user identity in the access terminal, where the report message is signed with a signature. The signature of the report message may be authenticated using the validation key to verify that the access terminal is authorized to use the access terminal identity included in the report message.

Such methods may further include recording the usage relationship between the access terminal identity and the user identity in a database accessible to an equipment identity register (EIR). In addition, a validation request transmission including the user identity and the access terminal identity may be received from an entity of a communication network. A database may be queried for a record verifying a usage relationship between the user identity and the access terminal identity. If a record verifies the usage relationship between the user identity and the access terminal identity, the access terminal may be determined as authorized. If, on the other hand, a record in the database disproves the usage relationship or if no record in the database verifies the usage relationship between the user identity and the access terminal identity, the access terminal may be determined to be unauthorized.

DETAILED DESCRIPTION

Figure 1:
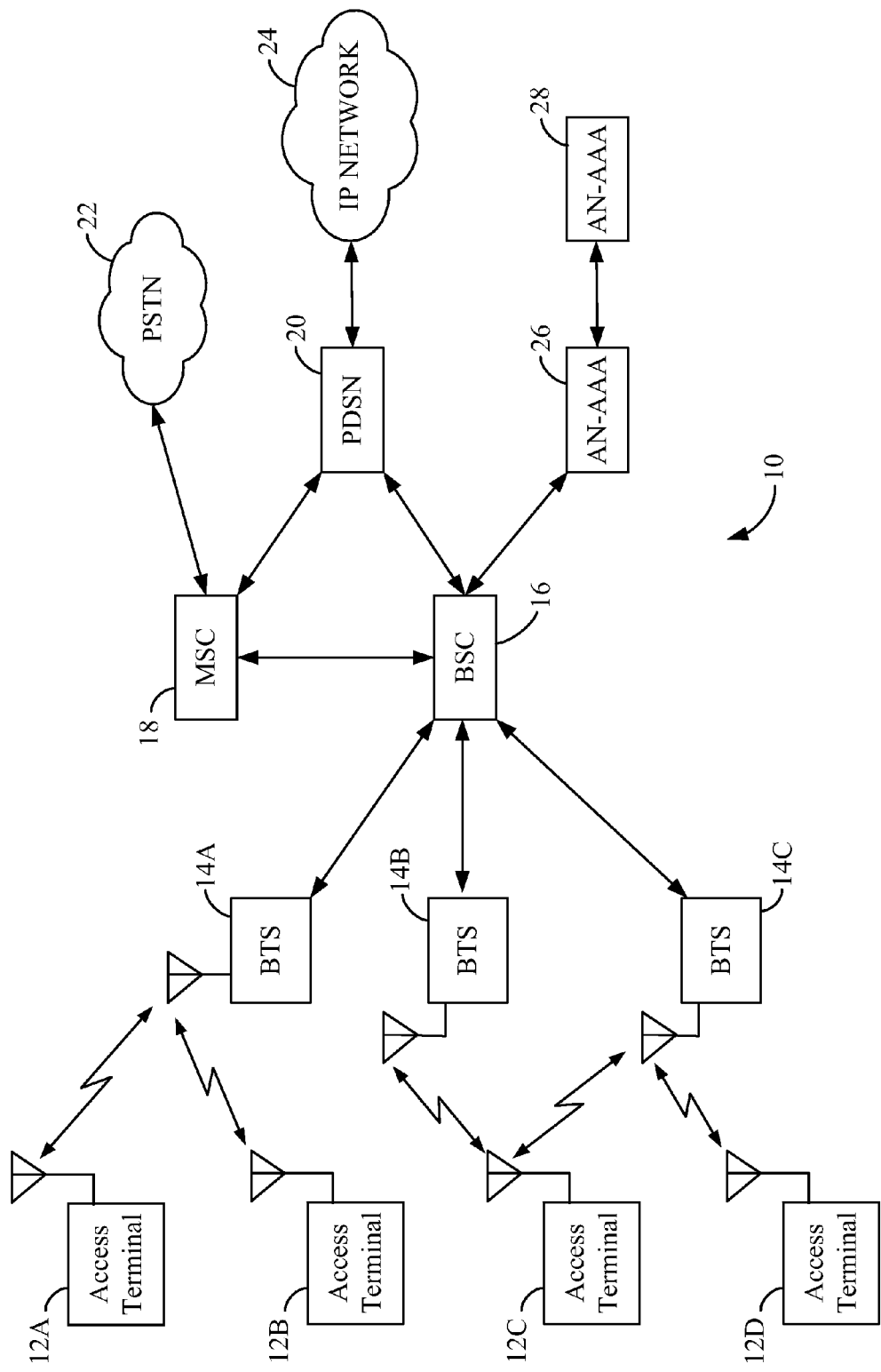
FIG. 1 is a block diagram illustrating an example of a wireless communication system in which one or more implementations of the present disclosure can find application.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The term "base station" and "access terminal" as used herein are meant to be interpreted broadly. For example, a "base station" may refer to a device that facilitates wireless connectivity (for one or more access terminals) to a communication or data network. Examples of "base stations" may include base stations transceivers (BTS), Node-B devices, femto cells, pico cells, etc. Furthermore, an "access terminal" may include mobile phones, pagers, wireless modems, personal digital assistants, personal information managers (PIMs), personal media players, palmtop computers, laptop computers, and/or other mobile communication/computing devices which communicate, at least partially, through a wireless or cellular network.

Overview

One feature provides apparatuses and methods for authenticating that an access terminal is authorized to use an access terminal identity. An access terminal may initially be provisioned with a validation key originating from an administration authority. During operation, the access terminal may determine that a user identity from a user identity module in the access terminal is not currently recorded for use with the access terminal. The access terminal may generate a report message that includes the user identity and the access terminal's identity to report a usage relationship between the user identity and the access terminal identity. The report message is signed with a signature that is generated based on the validation key to authenticate that the access terminal is an authorized user of the access terminal identity. The access terminal then sends the report message to a validation server.

Another feature provides apparatuses and methods for recording a usage relationship between the access terminal identity and a user identity. A validation server may be provisioned with a validation key originating from an administration authority. The validation server may receive a report message from an access terminal, where the report message reports a usage relationship between an access terminal identity and a user identity from a user identity module in the access terminal. The report message is signed with a signature that is authenticated by the validation server using the validation key. Since the validation key used by the access terminal to sign the report message is only available via authorized vendors, an authenticated signature indicates that the access terminal identity sent by the access terminal is valid and that the access terminal is an authorized device. The validation server can record the usage relationship between the access terminal identity and the user identity in a database that is accessible to an equipment identity register (EIR) so that a network entity can validate that the access terminal is authorized for use on the network.

Exemplary Network Environments

FIG. 1 is a block diagram illustrating an example of a wireless communication system 10 in which one or more implementations of the present disclosure can find application. As illustrated in FIG. 1, a wireless communication network 10 generally includes a plurality of access terminals (also called remote stations, mobile stations, subscriber units, or user equipment) 12a-12d, a plurality of base stations (also called base stations transceivers (BTS), Node-B devices, femto cells, pico cells, etc.) 14a-14c, a base station controller (BSC) (also called radio network controller or packet control function) 16, a mobile switching center (MSC) or switch 18, a packet data serving node (PDSN) or internetworking function (IWF) 20, a public switched telephone network (PSTN) 22 (typically a telephone company), and a packet switched data network 24 (typically an Internet Protocol (IP) network). The wireless communication network 10 may also include access network authentication, authorization and accounting equipment (AN-AAA) 26, 28 for providing user account status (normal, shutdown, arrears), and for maintaining and storing such user account information. For purposes of simplicity, four access terminals 12a-12d, three base stations 14a-14c, one BSC 16, one MSC 18, and one PDSN 20 are shown. It would be understood by those skilled in the art that there could be any number of access terminals 12, base stations 14, BSCs 16, MSCs 18, and PDSNs 20.

In one embodiment the wireless communication network 10 is a packet data service network. The access terminals 12a-12d may be any of a number of different types of wireless communication devices such as a portable phone, a cellular telephone that is connected to a laptop computer running IP-based Web-browser applications, a cellular telephone with associated hands-free car kits, a personal data assistant (PDA) running IP-based Web-browser applications, a wireless communication module incorporated into a portable computer, or a fixed location communication module such as might be found in a wireless local loop or meter reading system. In the most general embodiment, access terminals may be any type of communication unit.

The access terminals 12a-12d may be configured to perform one or more wireless packet data protocols such as described in, for example, the EIA/TIA/IS-707 standard. In a particular implementation, the access terminals 12a-12d generate IP packets destined for the IP network 24 and encapsulates the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In other implementations, the BSC 16 is coupled directly to the PDSN 20, and the MSC 18 is not coupled to the PDSN 20.

During typical operation of the wireless communication network 10, the base stations 14a-14c receive and demodulate sets of reverse link signals from various access terminals 12a-12d engaged in telephone calls, Web browsing, or other data communications. Each reverse link signal received by a given base station 14a-14c is processed within that base station 14a-14c. Each base station 14a-14c may communicate with a plurality of access terminals 12a-12d by modulating and transmitting sets of forward link signals to the access terminals 12a-12d. For example, as shown in FIG. 1, the base station 14a communicates with first and second access terminals 12a, 12b simultaneously, and the base station 14c communicates with third and fourth access terminals 12c, 12d simultaneously. The resulting packets are forwarded to the BSC 16, which provides call resource allocation and mobility management functionality including the orchestration of soft handoffs of a call for a particular access terminal 12a-12d from one base station 14a-14c to another base station 14a-14c. For example, an access terminal 12c is communicating with two base stations 14b, 14c simultaneously. Eventually, when the access terminal 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Each of the access terminals 12A-12D includes an identity. For example, for 3GPP-compliant access terminals (e.g., access terminals adapted for use in a wireless communication network 10 comprising a GSM network, WCDMA network or TD-SCDMA network, LTE network), the access terminals 12A-12D may each comprise an international mobile equipment identity (IMEI) number. As another example, for 3GPP2-compliant access terminals (e.g., access terminals adapted for use in a wireless communication network 10 comprising a CDMA network), the access terminals 12A-12D may each comprise a mobile equipment identifier (MEID).

In addition to an access terminal identity, each of the access terminals 12A-12D includes a user identity (or subscriber identity) that identifies the subscriber using the particular access terminal. For example, each access terminal 12A-12D may include a removable subscriber identification module (e.g., SIM, USIM, CSIM), or a removable user identification module (RUIM), depending on the particular implementation of the wireless communication network 10.

Exemplary Access Terminal and Subscriber Authentication Environment

Figure 2:
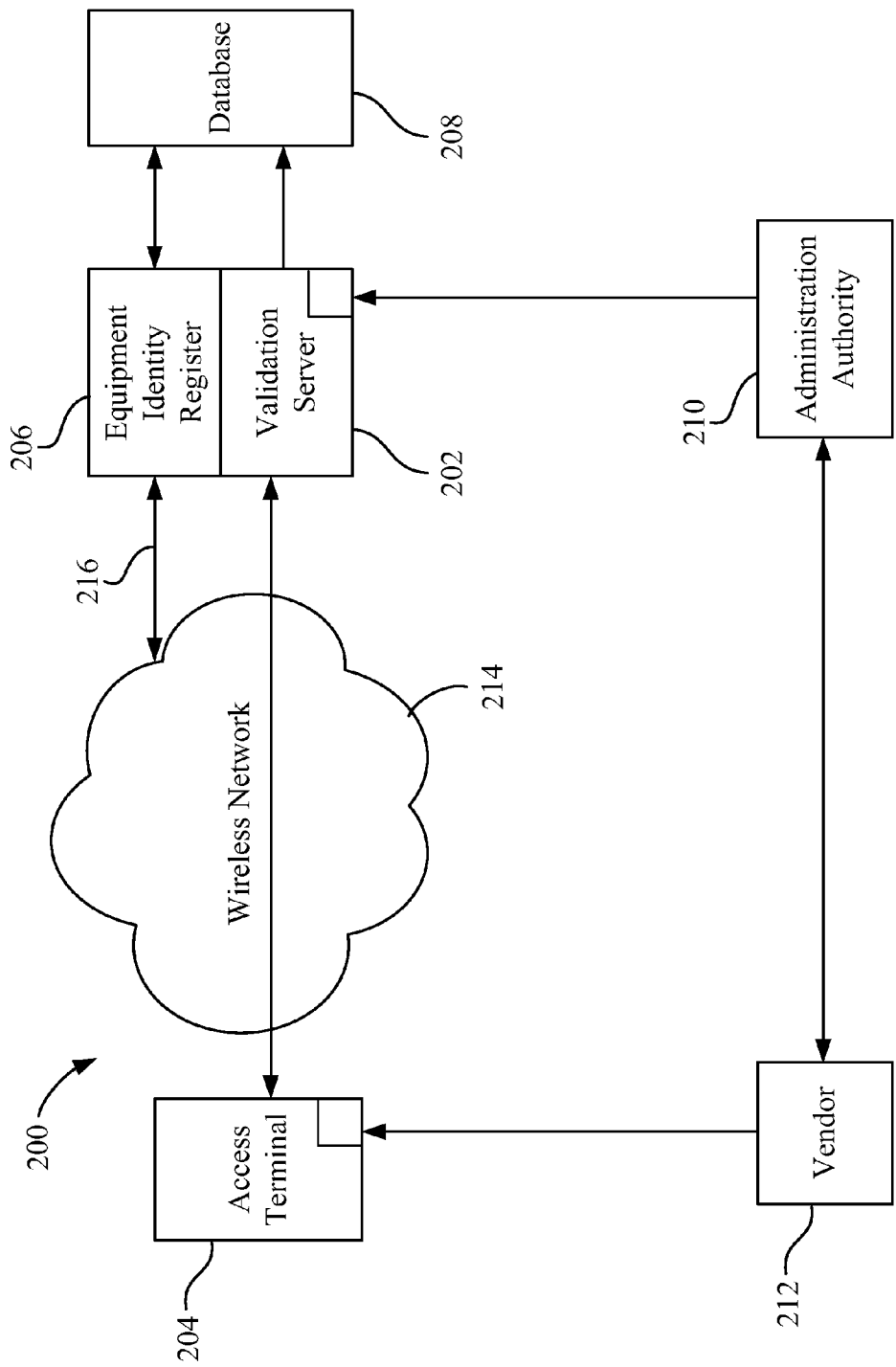
FIG. 2 is a block diagram illustrating an example of a network environment for authenticating an access terminal's identity and recording a usage relationship between the access terminal's identity and a subscriber's identity.

Certain aspects of the present disclosure provide techniques for facilitating the authentication of an access terminal (or device) identity and for recording a usage relationship between the access terminal identity and a user identity. FIG. 2 is a block diagram illustrating an example of a network environment 200 for authenticating an access terminal's identity and for recording a usage relationship between the access terminal's identity and a subscriber's identity. As illustrated in FIG. 2, the network may include a validation server 202 adapted to perform one or more authentication/validation functions of an access terminal 204. The validation server 202 may be implemented as a part of an equipment identity register (EIR) 206 or can be communicatively connected to an EIR 206 and/or to a database 208 accessible to the EIR 206. The database 208 includes a plurality of access terminal identities that are either authorized for use (e.g., whitelisted) or unauthorized for use (e.g., blacklisted). The EIR 206 may be deployed in either a centralized or a distributed topology, and may be deployed, for example, by a network operator, a government, and/or an industrial organization.

Both the validation server 202 and the access terminal 204 are provided with a validation key originating from an administration authority 210. Such a validation key may comprise, for example, a cryptographic key (e.g., an authentication key) or a digital certificate. The administration authority 210 may comprise a trustworthy entity that issues validation keys adapted to certify the ownership of a public key. According to at least one implementation, the administration authority 210 may issue the validation key to an authorized device vendor 212 of the access terminal 204 on request by the vendor 212. The validation key may be provided by the administration authority 210 as either a vendor-specific validation key or as a model-specific validation key. That is, the validation key may be provided by the administration authority 210 for use with all models of access terminals from the vendor 212 (vendor-specific), or it may be provided for use with only a specific model of access terminals from the vendor 212 (model-specific). In the case where each model is to be assigned with a unique validation key (model-specific), the assignment of the validation key may be performed as part of a device approval process through which the vendor 212 obtains a network-access license from the administration authority 210 for the particular model of access terminal.

After the vendor 212 obtains the validation key, the vendor 212 can securely store the assigned validation key (or a diversified key derived from the assigned validation key) into its access terminal products. For example, the vendor 212 may load the validation key into a secured storage medium of the access terminal 204 so that the validation key cannot be read out by an attacker. In addition to providing the validation key for each access terminal 204, the administration authority 210 also securely provides the validation key (or a diversified key derived from the validation key) to the validation server 202. In this manner, the access terminal 204 can employ the validation key for signing communications with the validation server 202, and the validation server 202 can employ the corresponding validation key to verify such signed communications from the access terminal 204.

According to a feature, the access terminal 204 is adapted to identify whether a user identity (e.g., International Mobile Subscriber Identity (IMSI)) associated with a user identity module (e.g., SIM, USIM, RUIM, CSIM) employed with the access terminal 204 is different from a user identity previously recorded for use with the access terminal 204. When it is determined that the user identity is different, the access terminal 204 may generate and send a transmission to the validation server including the user identity (e.g., IMSI) and the identity of the access terminal 204 (e.g., International Mobile Equipment Identity (IMEI), Mobile Equipment Identity (MEID)), which transmission is signed by the access terminal 204 using the validation key. The transmission may be automatically generated and sent by the access terminal 204 upon identifying the new user identity, or the transmission may be requested by the validation server 202 upon some indication that the combination of the user identity and access terminal identity is not currently recorded for use together (e.g., never before been used together, not recently used together, etc.).

The validation server 202 receives the transmission via a wireless communication network 214, which may be similar to the wireless communication network 10 in FIG. 1. Upon receipt of the transmission, the validation server 202 can authenticate the transmission by validating the signature using the validation key provisioned in the validation server 202. If the transmission is validated, indicating that the access terminal is an authorized device, the validation server 202 may update the database 208 with the new relationship between the user identity and the access terminal identity. Since access terminals produced by unauthorized vendors, or access terminals attempting to fake an identity (e.g., IMEI, MEID) will not have the validation key, the validation server 202 will be able to identify those access terminals.

In this manner, if some entity of the wireless communication network 214 seeks to verify that the access terminal 204 and its active subscriber are valid, that entity may make a validation request to the EIR 206, as indicated by arrows 216. Upon receiving such a validation request, the EIR 206 can perform a check in the database 208 to determine whether the user identity is authorized for use with the access terminal identity.

Figure 3:
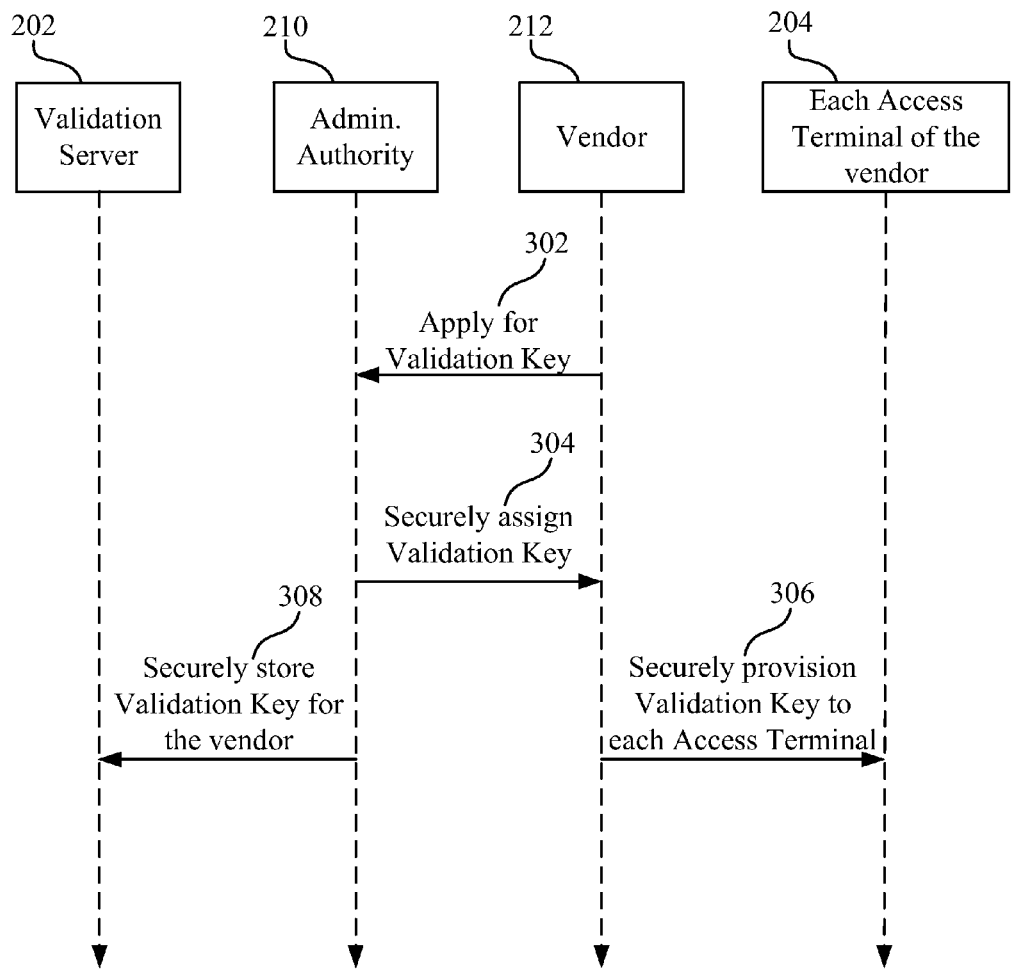
FIG. 3 is a flow diagram illustrating an example of provisioning a validation key in one or more access terminals and in the validation server.

Facilitating Validation Key Provisioning to Access Terminal and Validation Server FIG. 3 is a flow diagram illustrating an example of provisioning a validation key in one or more access terminals and in the validation server. In this example, the validation server 202, an access terminal 204, the administration authority 210 and vendor 212 of FIG. 2 are used for illustration purposes. The authorized access terminal vendor 212 may send a transmission to the administration authority 210 applying for or requesting a validation key at step 302.

The administration authority 210 may verify the qualification of the vendor 212, and may securely assign a validation key to the qualifying vendor 212 at step 304. The administration authority 210 verifies the qualification of the vendor 212 in order to ensure that validation keys are not given to an entity that will use the validation key to circumvent the security provided by the present disclosure. Once the validation key is assigned, the vendor 212 can securely provision the validation key (or a diversified key derived from the validation key) into the access terminals 204 of the vendor 212 at step 306. For example, the vendor 212 may load the validation key into a secured storage medium of each access terminal 204 so that the validation key cannot be read out by an attacker. With the vendor 212 securely storing the validation key in each authorized access terminal 204, unauthorized access terminals will not have the ability to obtain a validation key. Without a validation key, such unauthorized access terminals are unable to circumvent the security measures described herein.

At step 308, the administration authority 210 also securely provisions the validation key (or a diversified key derived from the validation key) into the validation server 202. For example, the administration authority 210 can communicate with the validation server 202 via a secured or encrypted transmission to provide the validation key to the validation server 202. The validation server 202 may also store the validation key in a secured storage medium so that the validation key cannot be read out by an attacker.

Facilitating Access Terminal Authentication Using a Validation Key

Figure 4A:
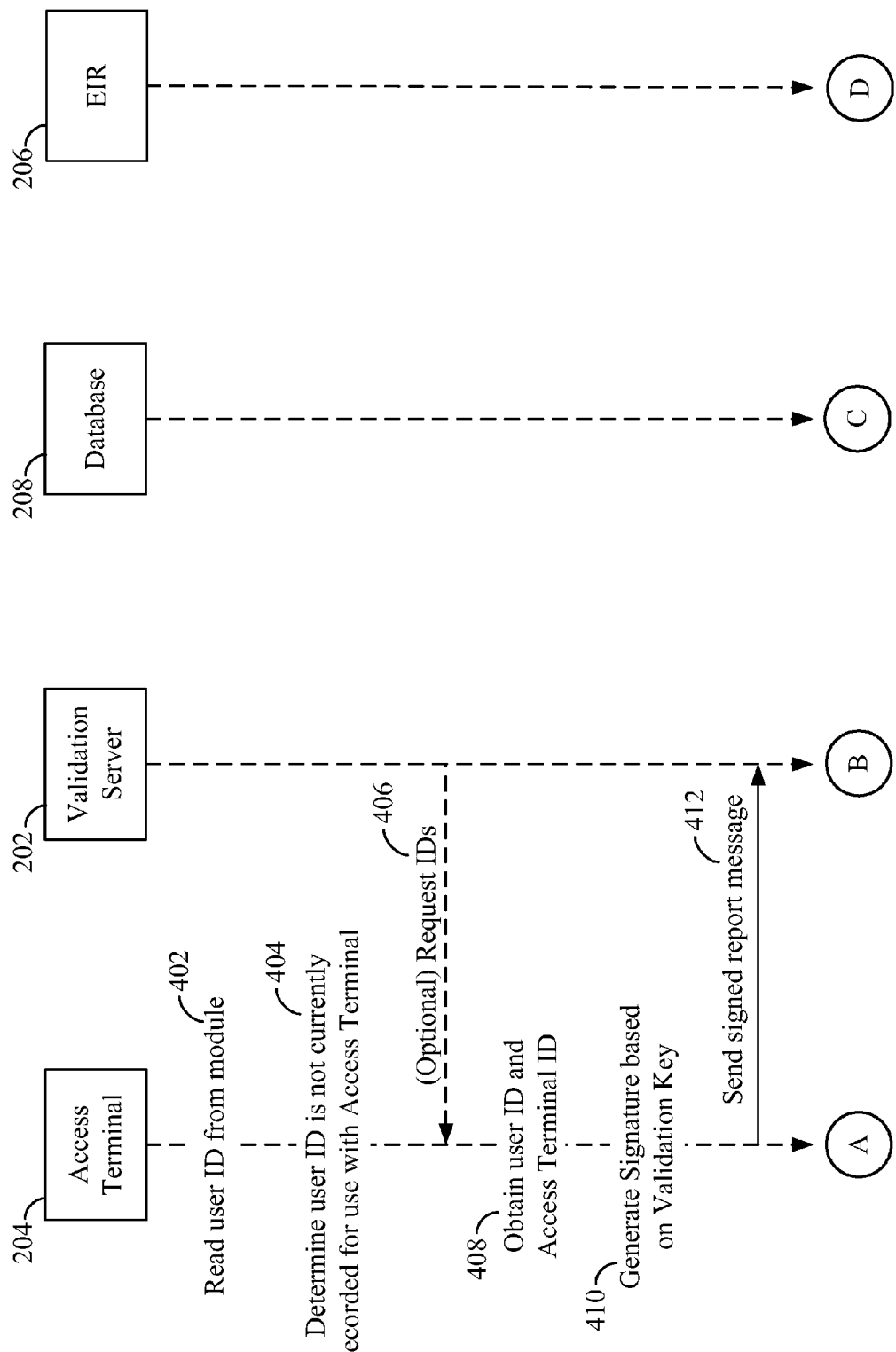
FIG. 4 (comprising FIGS. 4A and 4B) is a flow diagram illustrating an example of authenticating an access terminal identity and recording a relationship between the access terminal identity and a user identity.

FIG. 4 (comprising FIGS. 4A and 4B) is a flow diagram illustrating an example of authenticating an access terminal identity and recording a relationship between the access terminal identity and a user identity. In this example, the access terminal 204, validation server 202, database 208 and equipment identity register (EIR) 206 of FIG. 2 are used for illustration purposes. Initially, the access terminal 204 may read a user identity (e.g., IMSI) from a user identity module at step 402. For example, the access terminal 204 may be adapted to read the user identity each time the access terminal 204 is powered on. The user identity module comprises a module adapted to store a user identity in such a manner that the user identity can be changed. For example, the user identity module may comprise a removable user identity module (e.g., SIM, USIM, RUIM, CSIM). In other implementations, the user identity may comprise a module that is not removable, but rather reprogrammable, such as a non-RUIM adapted access terminal configured for a CDMA adapted communications network. In such embodiments, the user identity in the non-removable user identity module can be changed through Over-the-Air Service Provisioning (OTASP) or Over-the-Air Parameter Administration (OTAPA).

At step 404, the access terminal 204 determines whether the user identity is currently recorded for use with the access terminal 204. For example, the access terminal 204 may compare the user identity read from the user identity module with the user identity employed in the most recent successful registration. That is, the access terminal 204 compares the user identity with the user identity that was last successfully recorded for use with the access terminal 204. In other implementation, the access terminal 204 may determine whether the user identity has ever been recorded, or has been recorded within a determined period of time for use with the access terminal 204.

If the access terminal 204 determines that the user identity is recorded for use with the access terminal 204, then it may continue with normal operations. However, in response to determining that a user identity is not currently recorded, or optionally in response to a request 406 from the validation server 202, the access terminal 204 may generate a report message for the validation server 202 at step 408. The report message includes the identity of both the subscriber (e.g., IMSI) and the access terminal 204 (e.g., IMEI, MEID). The report message can also include additional information, such as one or more of a timestamp, a counter, a vendor ID, a model number, as well as other information.

In addition to obtaining the information for the report message, the access terminal 204 generates a signature for the report message based on the validation key 410. For example, the access terminal 204 may calculate a signature based on the validation key, or a medium or session-based key derived from the assigned validation key using any known key derivation algorithm. At step 412, the access terminal 204 sends a transmission including the signed report message (e.g., signature, access terminal identity and user identity) to the validation server 202. According to various implementations, the access terminal 204 may send the transmission via any means for sending transmissions over a wireless communication network 214. For example, the transmission can be sent as a short message service (SMS), a packet-based message or a signaling message with a predefined format.

When the validation server 202 receives the transmission comprising the signed report message, the validation server 202 retrieves the validation key associated with the access terminal 204 at step 414. For example, the validation server 202 may employ the identity of the access terminal 204 (e.g., IMEI, MEID), and/or vendor information associated with the access terminal 204, if such vendor information is included in the received transmission. Employing the respective validation key associated with the access terminal 204, the validation server verifies the signature of the report message at step 416 to authenticate that the access terminal 204 is authorized to use the access terminal identity included in the report message. If the signature is valid, the validation server 202 may update the database 208 to store a record of the new relationship between the identity of the access terminal 204 and the identity of the subscriber, as indicated at step 418. If, however, the signature is not valid, the validation server 202 may simply ignore the report message.

Upon a successful authentication and/or upon successfully updating the record in the database 208, the validation server 202 may send an acknowledgment transmission to the access terminal 204 at step 420, acknowledging that the signature was verified and/or that the database 208 has been updated. The acknowledgement transmission may be in one of various forms, depending on the form of the report message transmission. If the report message transmission is sent as a short message service (SMS) transmission, the acknowledgement transmission may comprise, for example, a Layer 2 Acknowledgement or SMS Acknowledgement. If the report message transmission is sent as a packet-based message, the acknowledgement transmission may comprise, for example, a TCP Acknowledgment for TCP packet delivery. Furthermore, if the report message transmission is sent as a signaling message, the acknowledgement transmission may comprise, for example, a signaling layer acknowledgement. Alternatively, the validation server 202 may return an explicit Acknowledgement message with pre-defined data format for the report message.

Upon receipt of the acknowledgement transmission, the access terminal 204 stores the user identity as a user identity recorded for use with the access terminal 204, as shown at step 422. The access terminal 204 can then operate under normal use.

During use of the access terminal 204 on a wireless communication network, the access terminal 204 may request access to certain services from the network, or the network (or some entity of the network) may desire to verify the status of the access terminal 204 for one or more particular reasons. In such a case, one or more entities (e.g., a MSC 18 (see FIG. 1) in the mobile switching domain or a Serving GPRS Support Node (SGSN) in the packet switching domain) in the serving network may request the EIR 206 to verify the status of the identity of the access terminal 204, as depicted at step 424. According to at least one implementation, the EIR 206 may receive such a request including the identity of the access terminal 204 (e.g., IMEI, MEID) and the identity of the subscriber (e.g., IMSI). The EIR 206 checks the database 208 at step 426. If the record stored at the database 208 indicates that the identity of the access terminal 204 is associated with and/or authorized for use with the user identity, then the EIR 206 can conclude at step 428 that the access terminal 204 is authorized. Conversely, if the record stored at the database 208 indicates that the identity of the access terminal 204 is not associated with and/or authorized for use with the user identity, then the EIR 206 can conclude at step 428 that the access terminal 204 is not authorized for use with the network.

Because only authorized devices are provided with a validation key, and since the validation key is used to update the record at the database 208, only authorized access terminals can be permitted to use the network. Any access terminal that reports a user identity to the network that is not recorded for use with the access terminal identity can be determined to be an unauthorized or illegal access terminal and can be blocked from using the network.

Exemplary Access Terminal

Figure 5:
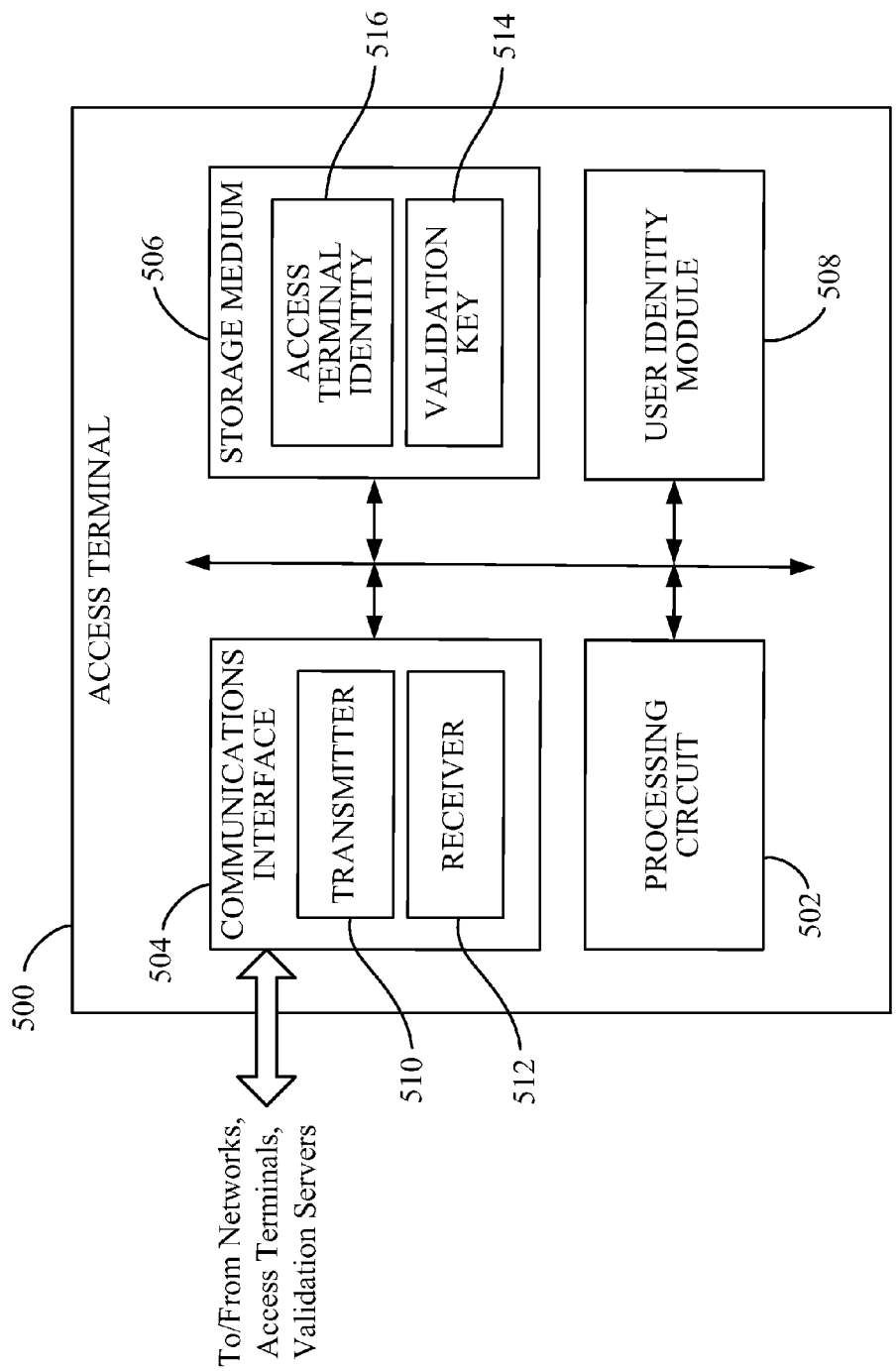
FIG. 5 is a block diagram illustrating select components of an access terminal according to at least one implementation.

FIG. 5 is a block diagram illustrating select components of an access terminal 500 according to at least one implementation. The access terminal 500 may include a processing circuit 502 coupled to a communications interface 504, a storage medium 506, and a user identity module 508.

The processing circuit 502 is arranged to obtain, process and/or send data, control data access and storage, issue commands, and control other desired operations. The processing circuit 502 may comprise circuitry configured to implement desired programming provided by appropriate media in at least one embodiment. For example, the processing circuit 502 may be implemented as one or more of a processor, a controller, a plurality of processors and/or other structure configured to execute executable instructions including, for example, software and/or firmware instructions, and/or hardware circuitry. Embodiments of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 502 are for illustration and other suitable configurations within the scope of the present disclosure are also contemplated.

The communications interface 504 is configured to facilitate wireless communications of the access terminal 500. The communications interface 504 may include at least one transmitter 510 and/or at least one receiver 512 (e.g., one or more transmitter/receiver chains). Furthermore, one or more antennas (not shown) may be electrically coupled to the communications interface 504.

The storage medium 506 may represent one or more devices for storing programming and/or data, such as processor executable code or instructions (e.g., software, firmware), electronic data, databases, or other digital information. According to at least one embodiment, one or more of such devices comprising the storage medium 506 may comprise a secured storage device. The storage medium 506 may be any available media that can be accessed by a general purpose or special purpose processor. By way of example and not limitation, the storage medium 506 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 506 may be coupled to the processing circuit 502 such that the processing circuit 502 can read information from, and write information to, the storage medium 506. In the alternative, the storage medium 506, or at least a portion thereof, may be integral to the processing circuit 502.

The storage medium 506 may include a validation key 514 stored therein. For example, the validation key 514 can be provisioned by a vendor 212 (see FIG. 2) within a secured portion of the storage medium 506. The validation key 514 may comprise, for example, a cryptographic key (e.g., an authentication key) or a digital certificate. The storage medium 506 may also include an access terminal identity 516 stored therein. The access terminal identity 516 may comprise, for example, an International Mobile Equipment Identity (IMEI) or a Mobile Equipment Identity (MEID).

The user identity module 508 is adapted to securely store a user identity, such as an International Mobile Subscriber Identity (IMSI). In some implementations, the user identity module 508 may comprise a removable user identity module 508 such that a user can remove and insert different user identity modules 508 as desired. Such a removable user identity module may include, for example, a SIM, USIM, CSIM, or RUIM. In other implementations, the user identity module 508 may comprise a programmable user identity module 508. An example of such a programmable user identity module 508 includes a module for securely storing a user identity that is employed in a CDMA adapted access terminal that does not use a RUIM. Such a programmable user identity module 508 can be programmed with a new or updated user identity with Over-the-Air Service Provisioning (OTASP) or Over-the-Air Parameter Administration (OTAPA).

According to one or more features, the processing circuit 502 may be adapted to perform any or all of the processes, functions, steps and/or routines related to the various access terminals as described herein above with reference to FIGS. 1-4 (e.g., access terminal 12A-12D and/or 204). As used herein, the term "adapted" in relation to the processing circuit 502 may refer to the processing circuit 502 being one or more of configured, employed, implemented, or programmed to perform a particular process, function, step and/or routine according to various features.

Figure 6:
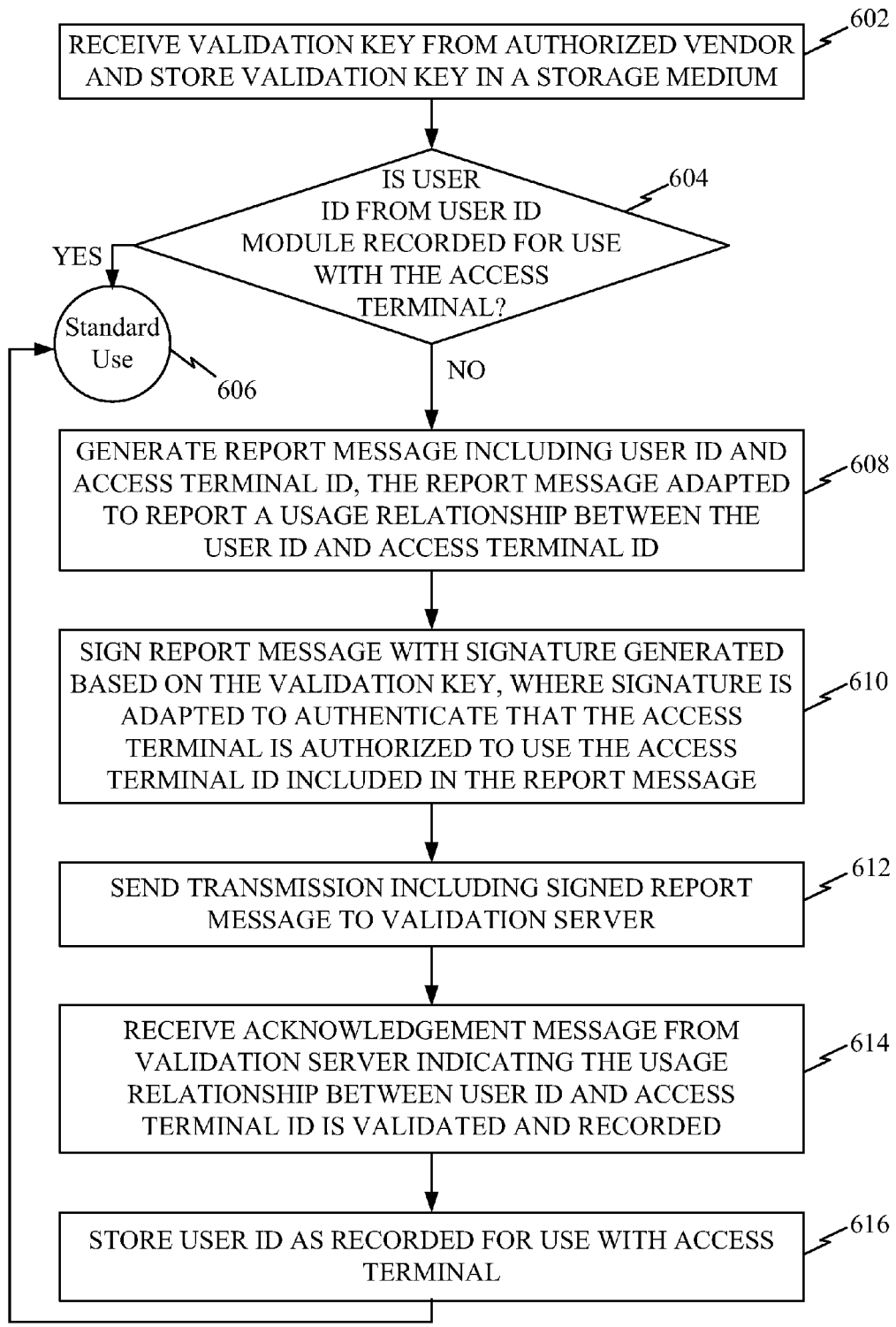
FIG. 6 is a flow diagram illustrating an example of at least one implementation of a method operational on an access terminal, such as the access terminal of FIG. 5.

FIG. 6 is a flow diagram illustrating an example of at least one implementation of a method operational on an access terminal, such as the access terminal 500. With reference to both of FIGS. 5 and 6, a validation key may be received from an authorized vendor and stored in a storage medium at step 602. For example, the validation key 514 can be provisioned into a secured portion of the storage medium 506 by the authorized vendor (such as the vendor 212 in FIG. 2). According to at least one implementation, the processing circuit 502 may be adapted to receive the validation key 514 from an authorized vendor, and then store the received validation key 514 in the storage medium 506.

At decision diamond 604, it is determined whether a user identity from a user identity module is recorded for use with the access terminal. For example, the processing circuit 502 can read the user identity from the user identity module 508. The processing circuit 502 can then compare the user identity to a user identity stored by the access terminal 500 as a user identity that is recorded for use with the access terminal 500. In at least one implementation, the processing circuit 502 may compare the user identity from the user identity module 508 to a user identity last recorded for use with the access terminal 500 and stored in the storage medium 506.

If it is determined that the user identity from the user identity module 508 is recorded for use with the access terminal 500, then the access terminal 500 can begin standard operations at step 606. However, if it is determined that the user identity is not recorded for use with the access terminal at 604, a report message may be generated to report a usage relationship between the user identity and the access terminal's identity at step 608. In some implementations, the report message may be generated automatically in response to the determination that the user identity is not recorded for use with the access terminal 500. In other implementations, the report message may be generated in response to a request received from a validation server. As an example, the processing circuit 502 can generate a report message that includes the user identity from the user identity module 508 and the access terminal identity 516. The report message is adapted to report to a validation server (such as the validation server 202 in FIG. 2) the usage relationship between the user identity and the access terminal identity 516. According to one or more implementations, the report message may be generated to also include additional information, such as one or more of a timestamp, a counter, a vendor ID, a model number, as well as other information.

In order to authenticate that the access terminal identity 516 included in the report message is authentic (i.e., not being faked by the access terminal in order to deceive the validation server), the access terminal signs the report message with a generated signature based on the validation key at step 610. For example, the processing circuit 502 can generate a signature based on the validation key 514 using an algorithm for generating such a digital signature. By way of example and not limitation, the processing circuit 502 can be adapted to employ one or more conventional digital signature algorithms to generate the signature, including an RSA-based signature scheme, DSA, ElGamal signature scheme, Schnorr signature, Pointcheval-Stern signature algorithm, Rabin signature algorithm, a pairing-based signature scheme (e.g., BLS signature scheme), as well as other conventional signature schemes or algorithms.

After the report message is generated and digitally signed, a transmission is sent to a validation server that includes the signed report message at step 612. For example, the processing circuit 502 can transmit the signed report message via the communications interface 504. According to one or more implementations, the processing circuit 502 may transmit the signed report message as one of a short messaging service (SMS), a packet-based message or a signaling message.

If transmission of the report message is unsuccessful, the processing circuit 502 can be adapted to resend the transmission. If the transmission is successful, the access terminal may receive an acknowledgement message from the validation server at step 614. The acknowledgement message can indicate that the usage relationship between the user identity and the access terminal identity is validated and recorded. For example, the processing circuit 502 may receive the acknowledgement report via the communications interface 504. The acknowledgement message can be received as a transmission type corresponding to the report message transmission. For example, the acknowledgement transmission may comprise a Layer 2 Acknowledgement or SMS Acknowledgement (corresponding to a SMS report message transmission), a TCP Acknowledgment (corresponding to a packet-based report message transmission), or a signaling layer acknowledgement (corresponding to a report message transmission as a signaling message). Alternatively, the validation server may return an explicit Acknowledgement message with pre-defined data format for the report message.

After the acknowledgement message is received, the access terminal 500 may store the user identity at step 616 with an indication that the user identity is recorded for use with the access terminal 500. For example, the processing circuit 502 may store the user identity in the storage medium 506 with some indication that the user identity has been recorded for use with the access terminal 500. In this manner, when the access terminal 500 repeats the forgoing method (e.g., when it is powered on again), it will determine the user identity to be properly recorded for use at decision diamond 604, and will go to standard use at 606. After the user identity is stored as a recorded user identity, the access terminal 500 may commence standard use at 606.

Exemplary Validation Server

Figure 7:
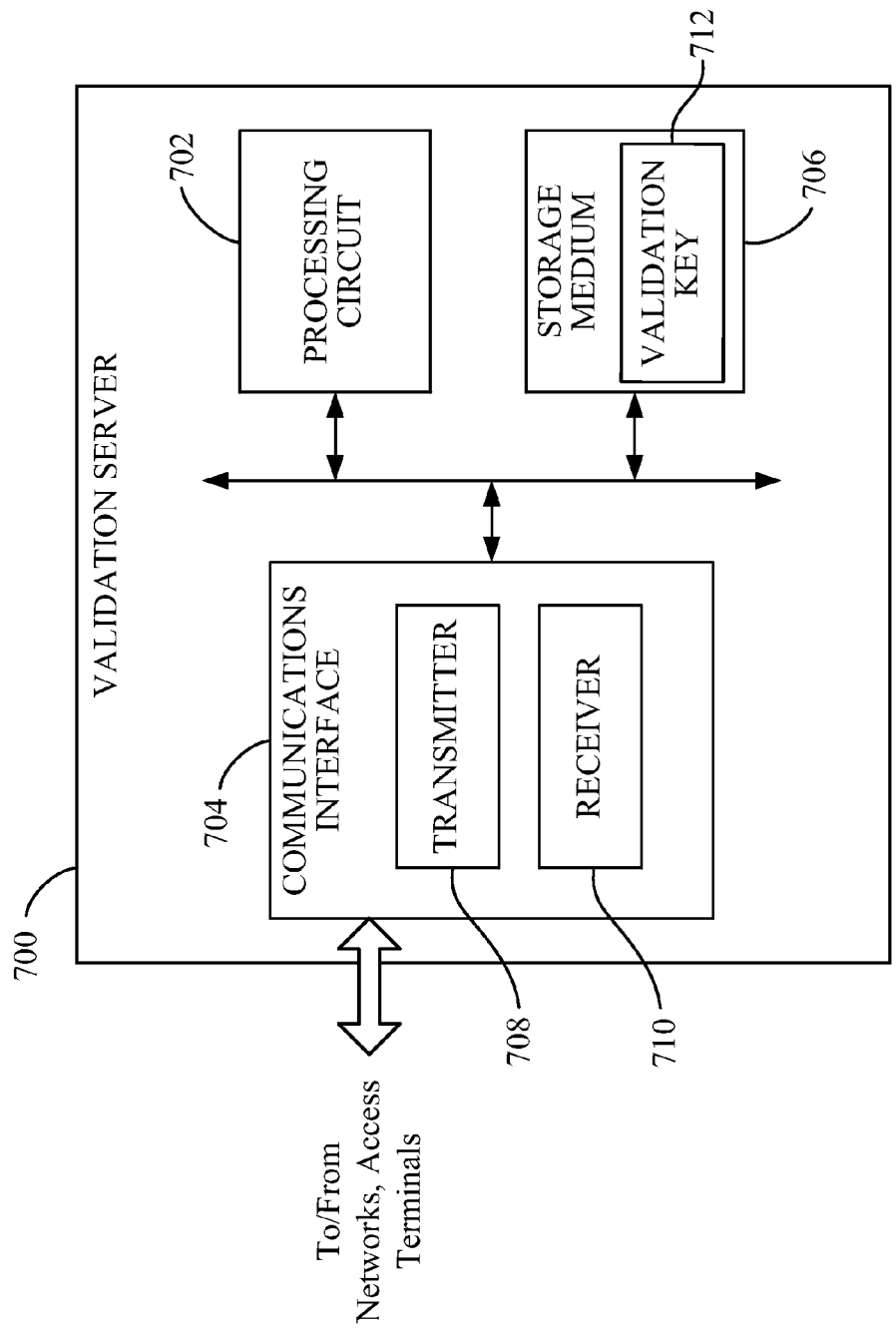
FIG. 7 is a block diagram illustrating select components of a validation server according to at least one implementation.

FIG. 7 is a block diagram illustrating select components of a validation server according to at least one implementation. As shown, a validation server 700 may include a processing circuit 702 coupled to a communications interface 704 and to a storage medium 706.

The processing circuit 702 is arranged to obtain, process and/or send data, control data access and storage, issue commands, and control other desired operations. The processing circuit 702 may comprise circuitry configured to implement desired programming provided by appropriate media in at least one embodiment. For example, the processing circuit 702 may be implemented as one or more of a processor, a controller, a plurality of processors and/or other structure configured to execute executable instructions including, for example, software and/or firmware instructions, and/or hardware circuitry. Embodiments of the processing circuit 702 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 702 are for illustration and other suitable configurations within the scope of the present disclosure are also contemplated.

The communications interface 704 is configured to facilitate wireless communications of the validation server 700. The communications interface 704 may include at least one transmitter 708 and/or at least one receiver 710 (e.g., one or more transmitter/receiver chains). Furthermore, one or more antennas (not shown) may be electrically coupled to the communications interface 704.

The storage medium 706 may represent one or more devices for storing programming and/or data, such as processor executable code or instructions (e.g., software, firmware), electronic data, databases, or other digital information. According to one or more embodiments, at least one of such devices comprising the storage medium 706 may comprise a secured storage device. The storage medium 706 may be any available media that can be accessed by a general purpose or special purpose processor. By way of example and not limitation, the storage medium 706 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 706 may be coupled to the processing circuit 702 such that the processing circuit 702 can read information from, and write information to, the storage medium 706. In the alternative, the storage medium 706, or at least a portion thereof, may be integral to the processing circuit 702.

The storage medium 706 may include a validation key 712 stored therein. For example, the validation key 712 can be provisioned by an administration authority 210 (see FIG. 2) into a secured portion of the storage medium 706. The validation key 712 corresponds to a validation key provisioned in one or more access terminals by an authorized vendor. For example, the validation key 712 may correspond to a type of access terminal or an identity of the vendor, as well as some combination of the two. The validation key 712 may comprise, for example, a cryptographic key (e.g., an authentication key) or a digital certificate.

The validation server 700, or at least some of the components of the validation server 700, may be implemented integral with an equipment identity register (EIR). For example, one or more of the processing circuit 702, the storage medium 706 or the communications interface 704 may be implemented as part of, or integrated into an EIR, such as EIR 206 in FIG. 2.

According to one or more features, the processing circuit 702 may be adapted to perform any or all of the processes, functions, steps and/or routines related to the various validation servers as described herein above with reference to FIGS. 1-4 (e.g., validation server 202). As used herein, the term "adapted" in relation to the processing circuit 702 may refer to the processing circuit 702 being one or more of configured, employed, implemented, or programmed to perform a particular process, function, step and/or routine according to various features.

Figure 8:
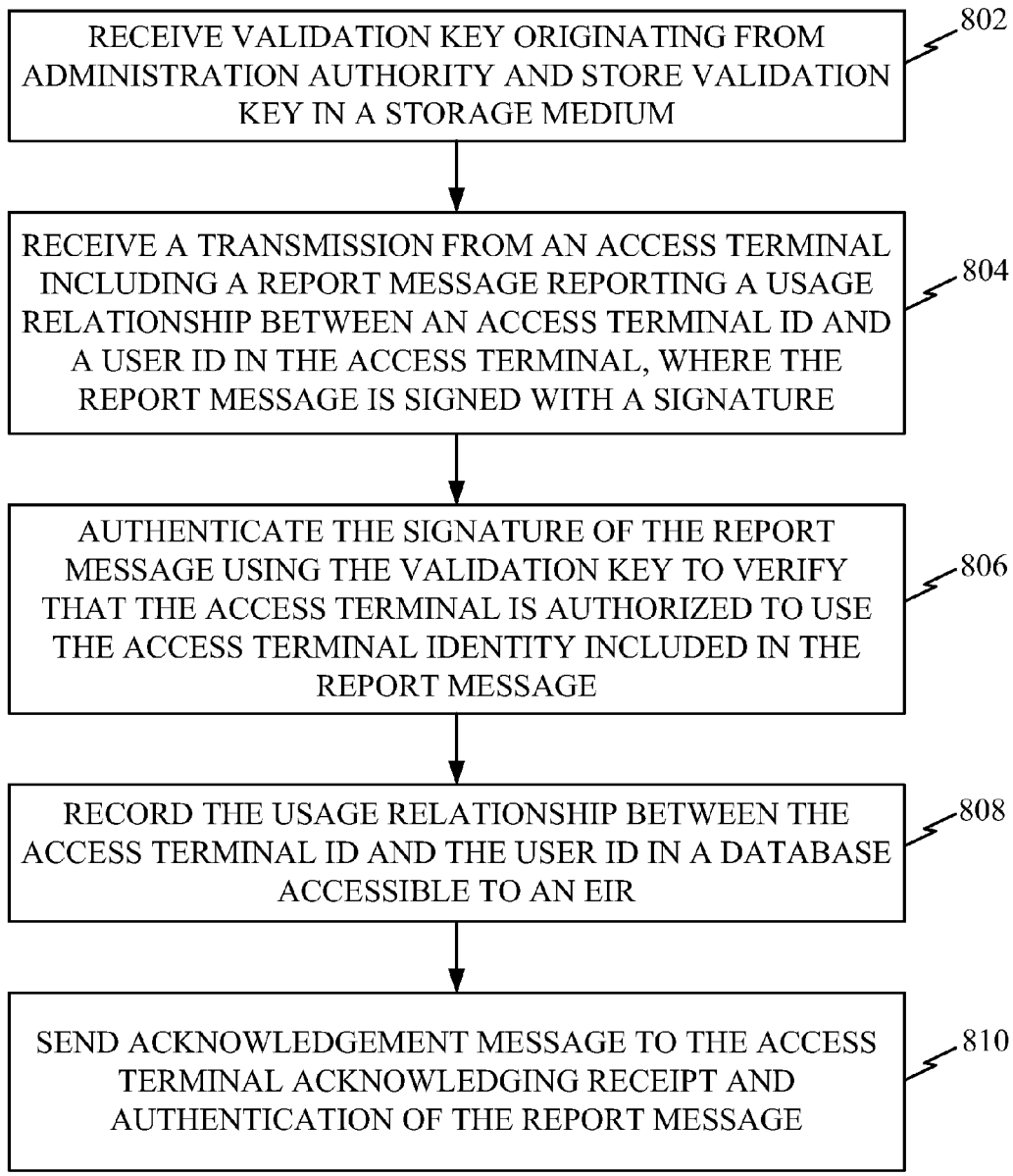
FIG. 8 is a flow diagram illustrating an example of at least one implementation of a method operational on a validation server, such as the validation server of FIG. 7.

FIG. 8 is a flow diagram illustrating an example of at least one implementation of a method operational on a validation server, such as validation server 700. With reference to both of FIGS. 7 and 8, a validation key originating from an administration authority may be received at the validation server and stored in a storage medium at step 802. For example, the processing circuit 702 may receive the validation key, and may store the validation key in the storage medium 706. The validation key may indicate that it corresponds to a validation key provisioned in a plurality of access terminals.

The validation server 700 may receive a transmission from an access terminal at step 804. The transmission includes a report message adapted to report a usage relationship between an access terminal identity and a user identity in the access terminal. The report message is also signed with a signature. According to at least one implementation, the processing circuit 702 may receive the transmission via the communications interface 704. Such a transmission may be received, in at least some implementations, as one of a Short Messaging Service (SMS) message, a packet-based message, or a signaling message.

At step 806, the validation server 700 authenticates the signature of the report message using the validation key. Authenticating the signature verifies to the validation server 700 that the access terminal is authorized to use the access terminal identity included in the report message. As an example, the processing circuit 702 may employ one or more conventional algorithms to authenticate the digital signature included with the report message using the validation key 712. In order to identify the proper validation key 712 to be employed for authentication, the processing circuit 702 may read, for example, the access terminal identity and/or vendor information associated with the access terminal (if included in the report message). Once the proper validation key 712 is identified, the processing circuit 700 can retrieve the proper validation key 712 and can apply the validation key 712 to authenticate the signature.

After the signature is authenticated, the validation server may, at step 808, record the usage relationship between the access terminal identity and the user identity in a database that is accessible to an equipment identity register (EIR), such as EIR 206 in FIG. 2. As noted above, some implementations of the validation server 700 may be integrated into an EIR. In such implementations, the processing circuit 702 may receive via the communications interface 704 a validation request transmission from an entity of a network, which validation request transmission includes a user identity and an access terminal identity. The processing circuit 702 may then query the database for a record verifying a valid usage relationship between the user identity and the access terminal identity. If a record in the database verifies the usage relationship, the processing circuit 702 may determine the access terminal to be authorized. If a record in the database disproves the usage relationship or if there is no record in the database verifying the usage relationship between the user identity and the access terminal identity, the processing circuit 702 may determine the access terminal to be unauthorized and may deny the access terminal access to the requesting network.

After the signature is authenticated and/or after the usage relationship is recorded, the validation server 700 may send an acknowledgement message to the access terminal acknowledging receipt and authentication of the report message, at step 810. For example, the processing circuit 702 may generate and send the acknowledgement message via the communications interface 704. The acknowledgement message may be sent as a transmission type corresponding to the of report message transmission. For example, the acknowledgement transmission may comprise a Layer 2 Acknowledgement or SMS Acknowledgement (corresponding to a SMS report message transmission), a TCP Acknowledgment (corresponding to a packet-based report message transmission), or a signaling layer acknowledgement (corresponding to a report message transmission as a signaling message). Alternatively, the validation server may return an explicit Acknowledgement message with pre-defined data format for the report message.

One or more of the components, steps, features and/or functions illustrated in FIGS. 1, 2, 3, 4, 5, 6, 7, and/or 8 may be rearranged and/or combined into a single component, step, feature or function or embodied in several components, steps, or functions. Additional elements, components, steps, and/or functions may also be added without departing from the scope of the present disclosure. The apparatus, devices and/or components illustrated in FIGS. 1, 2, 5 and/or 7 may be configured to perform one or more of the methods, features, or steps described in FIGS. 3, 4 (comprising 4A and 4B), 6 and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal, comprising:
   a communications interface adapted to facilitate wireless communications;
   a user identity module including a user identity;
   a storage medium including a validation key from an authorized vendor of the access terminal and an access terminal identity stored therein; and
   a processing circuit coupled to the communications interface, the user identity module, and the storage medium, the processing circuit adapted to:
      determine that the user identity from the user identity module is not recorded for use with the access terminal;
      generate a report message including the user identity and the access terminal identity, the report message adapted to report, to a validation server, a usage relationship between the user identity and the access terminal identity;
sign the report message that reports the usage relationship between the user identity and the access terminal identity with a signature that is generated based on the validation key, wherein the signature is adapted to authenticate that the access terminal is authorized to use the access terminal identity included in the report message; and
send a transmission including the signed report message via the communications interface.

2. The access terminal of claim 1, wherein the user identity module comprises a removable user identity module.

3. The access terminal of claim 2, wherein the removable user identity module comprises one of a Subscriber Identification Module (SIM), a Universal Subscriber Identity Module (USIM), a CDMA Subscriber Identification Module (CSIM) or a Removable User Identification Modules (RUIM).

4. The access terminal of claim 1, wherein the user identity comprises an International Mobile Subscriber Identity (IMSI).

5. The access terminal of claim 1, wherein the access terminal identity comprises one of an International Mobile Equipment Identity (IMEI) or a Mobile Equipment Identity (MEID).

6. The access terminal of claim 1, wherein the report message is generated in response to the processing circuit receiving a request transmission via the communications interface, the request transmission requesting the report message from the access terminal, or in response to a determination by the access terminal that the user identity from the user identity module has not been recorded for use with the access terminal identity.

7. The access terminal of claim 1, wherein the processing circuit is further adapted to send the transmission as one of a Short Messaging Service (SMS) message, a packet-based message, or a signaling message.

8. The access terminal of claim 1, wherein the processing circuit is further adapted to:
receive an acknowledgement via the communications interface, the acknowledgement indicating that the reported usage relationship between the user identity and the access terminal identity is validated and recorded; and
store the user identity in the storage medium as recorded for use with the access terminal.

9. A method operational on an access terminal, the method comprising:
storing a validation key from an authorized vendor of the access terminal in a storage medium;
determining that a user identity from a user identity module in the access terminal is not recorded for use with the access terminal;
generating a report message including the user identity and an access terminal identity, the report message adapted to report, to a validation server, a usage relationship between the user identity and the access terminal identity;
signing the report message that reports the usage relationship between the user identity and the access terminal identity with a signature that is generated based on the validation key, wherein the signature is adapted to authenticate that the access terminal is authorized to use the access terminal identity included in the report message; and
sending a transmission including the signed report message to a validation server.

10. The method of claim 9, wherein the determining that the user identity from the user identity module in the access terminal is not recorded for use with the access terminal comprises:
determining that the user identity from a removable user identity module disposed in the access terminal is not recorded for use with the access terminal.

11. The method of claim 9, wherein the determining that the user identity from the user identity module in the access terminal is not recorded for use with the access terminal comprises:
determining that the user identity from the user identity module in the access terminal is different from the one last recorded for use with the access terminal and stored in the storage medium of the access terminal.

12. The method of claim 9, wherein the generating the report message including the user identity comprises:
generating the report message including an International Mobile Subscriber Identity (IMSI) for the user identity.

13. The method of claim 9, wherein the generating the report message including the access terminal identity comprises:
generating the report message including one of an International Mobile Equipment Identity (IMEI) or a Mobile Equipment Identity (MEID) for the access terminal identity.

14. The method of claim 9, wherein the sending the transmission to the validation server comprises:
sending the transmission as one of a Short Messaging Service (SMS) message, a packet-based message or a signaling message.

15. The method of claim 9, further comprising:
receiving an acknowledgement from the validation server indicating the reported usage relationship between the user identity and the access terminal identity is validated and recorded; and
storing the user identity as a user identity recorded for use with the access terminal.

16. An access terminal, comprising:
means for storing a validation key from an authorized vendor of the access terminal;
means for determining that a user identity from a user identity module in the access terminal is not recorded for use with the access terminal;
means for generating a report message including the user identity and an access terminal identity, the report message adapted to report, to a validation server, a usage relationship between the user identity and the access terminal identity; and
means for signing the report message that reports the usage relationship between the user identity and the access terminal identity with a signature that is generated based on the validation key, wherein the signature is adapted to authenticate that the access terminal is authorized to use the access terminal identity included in the report message; and
means for sending a transmission including the signed report message to a validation server.

17. A non-transitory processor-readable medium comprising one or more instructions operational on an access terminal, which when executed by a processing circuit, causes the processing circuit to:

determine that a user identity from a user identity module in the access terminal is not recorded for use with the access terminal;

generate a report message including the user identity and an access terminal identity, the report message adapted to report, to a validation server, a usage relationship between the user identity and the access terminal identity;

sign the report message that reports the usage relationship between the user identity and the access terminal identity with a signature that is generated based on a validation key from an authorized vendor of the access terminal stored in a storage medium of the access terminal, wherein the signature is adapted to authenticate that the access terminal is authorized to use the access terminal identity included in the report message; and send a transmission including the signed report message to a validation server.

18. A validation server, comprising:
a communications interface adapted to facilitate wireless communications;
a storage medium; and
a processing circuit coupled to the communications interface, the processing circuit adapted to:
receive and store a validation key for an access terminal from an authorized vendor in the storage medium;
receive a transmission from the access terminal via the communications interface, the transmission including a report message reporting a usage relationship between an access terminal identity and a user identity in the access terminal, wherein the report message is signed with a signature; and
authenticate the signature of the report message that reports the usage relationship between the access terminal identity and the user identity using the validation key to verify that the access terminal is authorized to use the access terminal identity included in the report message.

19. The validation server of claim 18, wherein the processing circuit is further adapted to record the usage relationship between the access terminal identity and the user identity in a database accessible to an equipment identity register (EIR).

20. The validation server of claim 19, wherein the communications interface, the storage medium and the processing circuit are implemented integral with the EIR.

21. The validation server of claim 20, wherein the processing circuit is further adapted to:
receive via the communications interface a validation request transmission from a network entity, the validation request transmission including the user identity and the access terminal identity;
query the database for a record verifying a valid usage relationship between the user identity and the access terminal identity;
determine the access terminal to be authorized if a record in the database verifies the usage relationship between the user identity and the access terminal identity; and
determine the access terminal to be unauthorized if a record in the database disproves the usage relationship or if no record in the database verifies the usage relationship between the user identity and the access terminal identity.

22. The validation server of claim 18, wherein the processing circuit is further adapted to receive the transmission from the access terminal as one of a Short Messaging Service (SMS) message, a packet-based message, or a signaling message.

23. The validation server of claim 18, wherein the processing circuit is further adapted to send an acknowledgement message to the access terminal acknowledging receipt and authentication of the report message.

24. The validation server of claim 18, wherein the access terminal identity included in the report message comprises one of an International Mobile Equipment Identity (IMEI) or a Mobile Equipment Identity (MEID).

25. The validation server of claim 18, wherein the user identity included in the report message comprises an International Mobile Subscriber Identity (IMSI).

26. A method operational on a validation server, the method comprising:
receiving and storing a validation key for an access terminal from an authorized vendor in a storage medium;
receiving a transmission from the access terminal, the transmission including a report message reporting a usage relationship between an access terminal identity and a user identity in the access terminal, wherein the report message is signed with a signature; and
authenticating the signature of the report message that reports the usage relationship between the access terminal identity and the user identity using the validation key to verify that the access terminal is authorized to use the access terminal identity included in the report message.

27. The method of claim 26, further comprising:
recording the usage relationship between the access terminal identity and the user identity in a database accessible to an equipment identity register (EIR).

28. The method of claim 27, further comprising:
receiving a validation request transmission from an entity of a communication network, the validation request transmission including the user identity and the access terminal identity;
querying the database for a record verifying a usage relationship between the user identity and the access terminal identity;
determining the access terminal to be an authorized access terminal if a record in the database verifies the usage relationship between the user identity and the access terminal identity; and
determining the access terminal to be an unauthorized access terminal if a record in the database disproves the usage relationship or if no record in the database verifies the usage relationship between the user identity and the access terminal identity.

29. The method of claim 26, wherein the receiving the transmission from the access terminal comprises receiving the transmission as one of a Short Messaging Service (SMS) transmission, a packet-based transmission, or a signaling message transmission.

30. The method of claim 26, further comprising:
sending an acknowledgement message to the access terminal acknowledging receipt and authentication of the report message.

31. The method of claim 26, wherein the access terminal identity included in the report message comprises one of an International Mobile Equipment Identity (IMEI) or a Mobile Equipment Identity (MEID).

32. The method of claim 26, wherein the user identity included in the report message comprises an International Mobile Subscriber Identity (IMSI).

33. The method of claim 26, wherein the authenticating the signature of the report message comprises:
- determining the validation key corresponding to the access terminal that sent the transmission including the report message;
- retrieving the corresponding validation key; and
- applying the validation key to authenticate the signature.

34. A validation server, comprising:
- means for receiving and store a validation key for an access terminal from an authorized vendor in a storage medium;
- means for receiving a transmission from an access terminal, the transmission including a report message reporting a usage relationship between an access terminal identity and a user identity in the access terminal, wherein the report message is signed with a signature; and
- means for authenticating the signature of the report message that reports the usage relationship between the access terminal identity and the user identity using the validation key to verify that the access terminal is authorized to use the access terminal identity included in the report message.

35. The validation server of claim 34, further comprising:
- means for recording the usage relationship between the access terminal identity and the user identity in a database accessible to an equipment identity register (EIR).

36. The validation server of claim 35, further comprising:
- means for determining whether an access terminal is authorized or unauthorized when an entity of a communication network sends a validation request with an obtained user identity and access terminal identity.

37. A non-transitory processor-readable medium comprising one or more instructions operational on a validation server, which when executed by a processing circuit, causes the processing circuit to:
- receive and store a validation key for an access terminal from an authorized vendor in a storage medium;
- receive a transmission from an access terminal, the transmission including a report message reporting a usage relationship between an access terminal identity and a user identity in the access terminal, wherein the report message is signed with a signature; and
- authenticate the signature of the report message that reports the usage relationship between the access terminal identity and the user identity using the validation key to verify that the access terminal is authorized to use the access terminal identity included in the report message.

38. The non-transitory processor-readable medium of claim 37, further comprising one or more instruction operational on the validation server, which when executed by the processing circuit, causes the processing circuit to:
- record the usage relationship between the access terminal identity and the user identity in a database accessible to an equipment identity register (EIR).

39. The non-transitory processor-readable medium of claim 38, further comprising one or more instruction operational on the validation server, which when executed by the processing circuit, causes the processing circuit to:
- determine whether an access terminal is authorized or unauthorized when an entity of a communication network sends a validation request with an obtained user identity and access terminal identity.

* * * * *